(12) United States Patent  (10) Patent No.: US 7,708,031 B2
Fatula, Jr.  (45) Date of Patent: May 4, 2010

(54) CHECK VALVE

(75) Inventor: Joseph J. Fatula, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 11/558,963

(22) Filed: Nov. 13, 2006

(65) Prior Publication Data

US 2008/0110516 A1 May 15, 2008

(51) Int. Cl.
F16K 15/14 (2006.01)
(52) U.S. Cl. ........................ 137/843; 137/903
(58) Field of Classification Search ................. 137/843, 137/903, 852, 112
See application file for complete search history.

(56) References Cited

U.S. PATENT DOCUMENTS

| 5,088,902 | A  | * | 2/1992  | Marioni | .................... | 417/415    |
| 6,279,606 | B1 | * | 8/2001  | Hunnicutt et al. | ...... | 137/543.19 |
| 6,470,904 | B1 |   | 10/2002 | Tai et al. | .................... | 137/15.18  |
| 2004/0079424 | A1 |   | 4/2004 | Takeda et al. | .......... | 137/624.13 |
| 2004/0112442 | A1 |   | 6/2004 | Maerkl et al. | ............... | 137/597 |
| 2004/0253821 | A1 |   | 12/2004 | Howitz et al. | ............... | 438/689 |
| 2005/0004250 | A1 |   | 1/2005 | Hasselbrink, Jr. et al. | ... | 522/142 |

OTHER PUBLICATIONS

Unger et al., "Monolithic Microfabricated Valves and Pumps by Multilayer Soft Lithography," Science Magazine 288, Apr. 2000, pp. 113-116.

* cited by examiner

Primary Examiner—John Rivell
Assistant Examiner—Macade Brown
(74) Attorney, Agent, or Firm—Arthur J. Samodovitz

(57) ABSTRACT

A check valve and method for manufacture of the check valve. The check valve comprises a substrate and a channel in the substrate. The channel has an anchor region, a channel corridor and a valve seat region. There is an elastomeric valve mechanism in the channel. The valve mechanism has an anchor portion anchored in the anchor region, an elastomeric web portion in the channel corridor and a valve plug in the valve seat region. The elastomeric web portion interconnects the anchor portion and the valve plug. The elastomeric web portion is in a stretched state such that the valve plug is forced by the elastomeric web portion against the valve seat region to seal the valve seat region. The force of the elastomeric web portion can be overcome by operative fluid pressure within the channel to separate the valve plug from the valve seat region and thereby open the channel at the valve seat region to allow the fluid to exit the channel via the valve seat region.

10 Claims, 10 Drawing Sheets

CHECK VALUE

FIELD OF THE INVENTION

The present invention relates generally to check valves, and more specifically to miniature or nano scale check valves.

BACKGROUND OF THE INVENTION

Check valves are used to control flow of fluids, such as liquids or gases, in devices. For example, check valves can be used to control flow of gases and liquids in fluid systems of medical instruments, industrial process control equipment, medical devices (including implanted devices), mixing apparatus and chromatography. Most types of check valves are on/off valves for the flow of fluid. Check valves also prevent inadvertent mixing and prevent back flow of fluids. Typically in a check valve, there is a valve plug which can be moved to either block the flow or permit the flow of the fluid out of a channel. The valve plug can be moved in a variety of manners such as by fluid pressure moving it to block or unblock a channel containing the fluid. Alternately, the valve plug can be moved by electromagnetic, electrostatic, thermal, stress or other forces either alone on in combination with the fluid pressure.

US Published patent application 2005/0004250 to Hasselbrink Jr. et al. discloses a monolithic polymer element for flow control in a microfluidic device. A free-moving valve plug can be moved by control pressure in one micro channel to either block or unblock flow of the operative fluid in another intersecting micro channel. Also in US 2005/0004250, another valve plug can be moved against or away from an opening in a channel to either block or unblock the channel.

A publication by Unger et al. in Science magazine 288, 113-116 of April 2000 discloses control of fluid flow in micro channels. There are soft elastomer control lines that intersect the microfluidic channels fabricated in an elastomeric substrate material. Applying pressure to the externals surfaces of the control lines causes them to deform, closing off the part of the channel they intersect.

While the foregoing valve mechanisms are effective, further improvements are need to simplify manufacture and provide miniature check valves.

Accordingly, an object of the present invention is to provide a miniature check valve that can be made by an inexpensive manufacturing process.

Another object of the present invention is to provide a process for manufacturing a miniature check valve.

SUMMARY OF THE INVENTION

The present invention resides in a check valve and method for manufacture of the check valve. The check valve comprises a substrate and a channel in the substrate. The channel has an anchor region, a channel corridor and a valve seat region. There is an elastomeric valve mechanism in the channel. The valve mechanism has an anchor portion anchored in the anchor region, an elastomeric web portion in the channel corridor and a valve plug in the valve seat region. The elastomeric web portion interconnects the anchor portion and the valve plug. The elastomeric web portion is in a stretched state such that the valve plug is forced by the elastomeric web portion against the valve seat region to seal the valve seat region. The force of the elastomeric web portion can be overcome by operative fluid pressure within the channel to separate the valve plug from the valve seat region and thereby open the channel at the valve seat region to allow the fluid to exit the channel via the valve seat region.

DETAILED DESCRIPTION OF THE PREFERRED EMBODIMENTS

Figure 1:
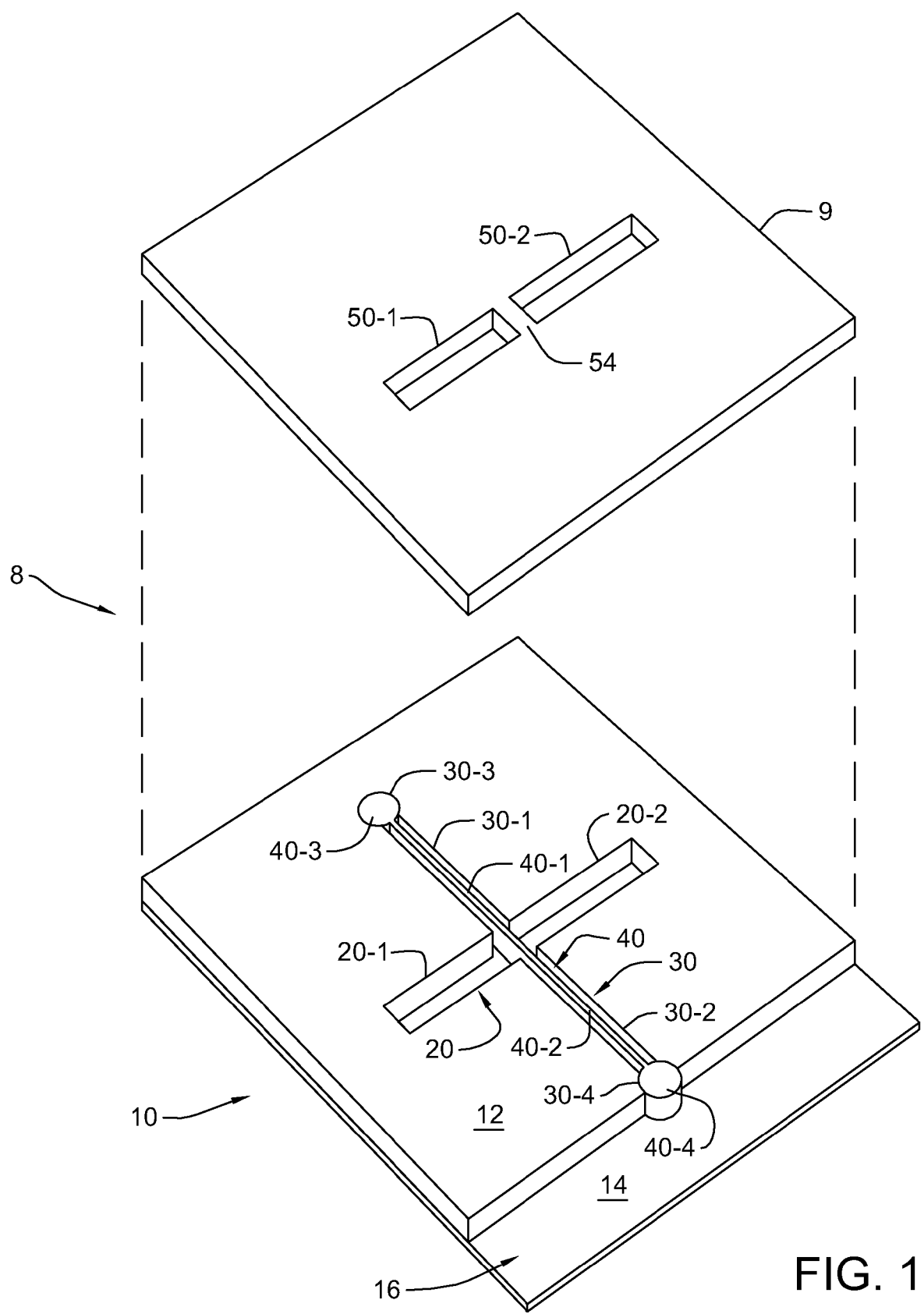
FIG. 1 is an exploded view of a check valve, including a lower operative layer and an upper fluid supply layer, according to one embodiment of the present invention.

The present invention will now be described in detail with reference to the figures. FIG. 1 illustrates a check value generally designated 8 in accordance with the present invention. Check valve 8 comprises a lower, valve layer 10 which contains an elastomeric valve mechanism 40 in a channel 30 in a substrate 12. Check valve 8 also comprises an upper layer or top plate 9 with openings 50-1 and 50-2 to supply a fluid, such as a liquid or gas, to channel 20 en route to channel 30. The fluid will either pass through channel 30 or be blocked by the valve mechanism 40 from passing through channel 30. Top plate 9 also forms a top of channel 30 to enclose this channel.

The lower valve layer 10 includes substrate 12 made of crystalline, polycrystalline, glass, ceramic, metal, polymer, silicon or other material. Substrate 12 can be bonded by an adhesive onto base plate 14 or deposited or grown on base plate 14. The base plate 14 can comprise silicon, glass, ceramic, metal, polymer or other material. One side of substrate 12, base plate 14 and top plate 9 form a channel 16 for fluid passing out through the check valve, and is used to direct and deliver the fluid to the intended target. Top plate 9 can comprise silicon, glass, ceramic, metal, polymer or other material. Channel 20 can be etched into substrate 12. By way of example, if substrate 12 is made of silicon, channel 20 can be etched into the substrate by known semiconductor processing techniques such as photolithography or chemical etching to remove the material in the region of the channel. Alternately, channel 20 can be defined using a sacrificial material, the region outside the sacrificial material then deposited via another known technique and then the sacrificial material in the channel removed to define the channel. Although the dimensions of channel 20 are suited to the viscosity and volume of fluid that needs to flow through the check valve 10, by way of example, channel 20 can be one micron to tens of millimeters wide and tens of microns to hundreds of millimeters long for a fluid with the same or less viscosity as water. The cross-sectional shape of channel 20 is not critical, provided it allows for unobstructed flow of the fluid. A generally rectangular shape is preferred although with known etching processes, the corners may be rounded. For purposes of explanation (in the orientation of FIG. 1), a lower left hand portion of channel 20 is referenced as channel portion 20-1, and an upper right hand portion of channel 20 is referenced as channel portion 20-2.

Channel 30 has also been etched into substrate 12. If substrate 12 is made of a semiconductor material such as silicon, channel 30 can be etched into the substrate 12 by known semiconductor processing techniques such as photolithography or chemical etching to remove the material in the channel. Channel 30 intersects channel 20, for example, at a right angle. For purposes of explanation (in the orientation of FIG. 1) a center left hand portion of channel 30 is referenced as channel portion 30-1, and a center right hand portion of channel 30 is referenced as channel portion 30-2, an uppermost left hand portion of channel 30 is referenced as channel portion 30-3, and a lowermost right hand portion of channel 30 is referenced as channel portion or valve seat 30-4. Although the dimensions of channel 30 are suited to the viscosity and volume of fluid that needs to flow through the check valve 10, channel portions 30-1 and 30-2 can be one micron to tens of millimeters wide and tens of microns to hundreds of millimeters long for a fluid with the same or less viscosity as water. Preferably, channel 30 has the same depth as channel 20. The cross-sectional shape of channel portions 30-1 and 30-2 is not critical, provided it allows for unobstructed flow of the fluid. A generally rectangular shape is preferred although with known etching processes, the corners may be rounded. Channel portions 30-1 and 30-2 form a corridor for flow of the fluid and for an elastomeric web 40 of the valve mechanism, as described below. Uppermost left hand portion 30-3 is preferably circular in a cross-section parallel to substrate 12, and has the same depth as channel portions 30-1 and 30-2. Alternately, the uppermost left hand portion can be hexagonal, rectangular, or other non circular cross-section. The purpose of uppermost left hand portion 30-3 is to retain or anchor one end of the elastomeric web 40 as described below, and does not provide an exit for fluid from channel 30. (Without pressure from the fluid, the elastomeric web 40 is in tension, and biases the web portion or plug 40-4 inwardly against seat portion 30-4 to seal the channel.) Lowermost right hand seat portion 30-4 is preferably semicircular in a cross-section parallel to substrate 12, and has the same depth as channel portions 30-1 and 30-2. Alternately, lowermost right hand portion 30-4 can be hexagonal, rectangular, or other non circular cross-section. The shape of the cross-section of portion 30-4 determines the linearity of the turn-on/turn-off characteristics of the check valve. Seat portion 30-4 allows a plug 40-4 of the valve mechanism 40 to seal channel 30 when the pressure of the fluid in channel 30 is below a threshold, actuation level. Portion 30-4 also allows the passage of fluid from channel 30 into channel 16 when the pressure of the fluid in channel 30 is sufficient to overcome the elastomeric inward force of the elastomeric web 40 and force the plug away from valve seat 30-4 thereby opening channel 30 to channel 16.

Elastomeric valve mechanism 40 lies in channel 30. By way of example, valve mechanism 40 is made from rubber, silicone elastomeric or other elastic polymeric material. Elastomeric valve mechanism 40 comprises center elastomeric web portions 40-1 and 40-2 and two cylindrical end bulbs 40-3 and 40-4. Elastomeric web portions 40-1 and 40-2 have the same height as the depth of channel 30. As explained below, this causes elastomeric web portions 40-1 and 40-2 to isolate channel portion 20-1 from channel portion 20-2 when upper layer 9 is joined to lower layer 10. Elastomeric web portions 40-1 and 40-2 are narrower than channel 30 to allow fluid to pass between the side walls of channel portions 30-1 and 30-2 and both sides of elastomeric web portions 40-1 and 40-2. After formation in channel 30, elastomeric web or valve mechanism 40 is inherently in a tensioned or stretched state. With no significant fluid pressure from channel 30 or with a significant fluid pressure from channel 30 less than the actuation threshold, end bulb or valve plug 40-4 is forced by the elastomeric tensional force of elastomeric web portions 40-1 and 40-2 against channel seat 30-4. Under these conditions, valve plug 40-4 seats in valve seat 30-4 and seals channel 30, such that fluid in channels 20 and 30 cannot flow from channel 30 into channel 16. However, if the fluid pressure in channel 30 is greater than the actuation threshold of valve mechanism 40, the fluid pressure in channel 30 forces outwardly against valve plug 40-4 and stretches web portions 40-1 and 40-2 such that valve plug 40-4 moves away from semicircular valve-seat 30-4 of channel 30 allowing the fluid in channel 30 to flow into channel 16 and toward its intended destination. The inherent inward tension of the elastomeric web 40 can be formed by controlled shrinkage of the web material during curing.

FIG. 1 also illustrates upper layer or top plate 9 in the exploded view of check valve 8. After final assembly, upper layer 9 is bonded by adhesive to substrate 12 or is deposited or grown on substrate 12. Upper layer 9 can be formed from a silicon, glass, ceramic, metal, polymer or other material. Upper layer 9 has two channel openings 50-1 and 50-2 which pass through the thickness of layer 9. Channel openings 50-1 and 50-2 can be formed by etching through substrate 9 with typical semiconductor like processing techniques using photolithography to define the image and an etch to remove the material. Alternatively, the openings 50-1 and 50-2 can be formed with sacrificial material, around which layer 9 is deposited, following which the sacrificial material is removed producing similar results to the etch approach. Channel opening 50-1 has the same width as channel 20-1 and a lesser length than channel 20-1, and channel opening 50-2 has the same width as channel 20-2 and a lesser length than channel 20-2, such that center material 54 of layer 9 separates channel opening 50-1 from channel opening 50-2. The center material 54 spans channel 30 and elastomeric web portions 40-1 and 40-2 (at the intersection of elastomeric web portions 40-1 and 40-2) such that elastomeric web portions 40-1 and 40-2 substantially isolate channel opening 50-1 and channel 20-1 from channel opening 50-2 and channel 20-2. Thus, fluid in channel opening 50-1 can be used independently of fluid in channel opening 50-2, and vice versa, to actuate valve mechanism 40. (In one embodiment of the present invention, when fluid pressure above the actuation threshold is supplied through one channel opening only, either channel opening 50-1 or 50-1, then the fluid pressure forces the elastomeric web portions 40-1 and 40-2 against the opposite channel portion 20-2 or 20-1, respectively, sealing off channel portion 20-2 or 20-1. However, in another embodiment of the present invention, when fluid pressure above the actuation threshold is supplied through one channel opening only, either channel opening 50-1 or 50-1, then the fluid pressure does not force the elastomeric web portions 40-1 and 40-2 against the opposite channel portion 20-2 or 20-1, respectively, and does not seal off the opposite channel portion 20-2 or 20-1.)

Figure 2:
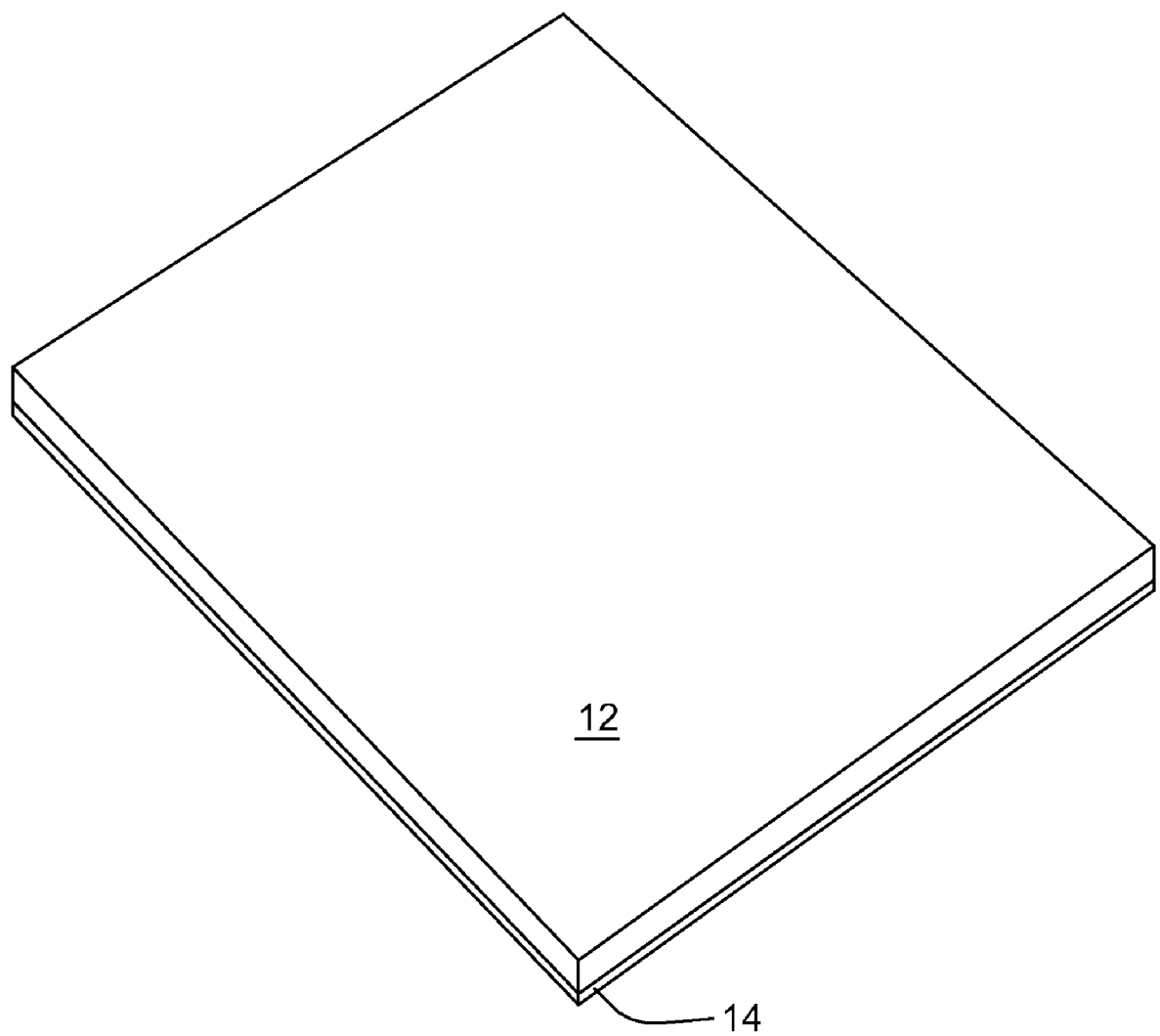
FIG. 2 is a perspective view of a first stage in manufacture of the lower operative layer of the check valve of FIG. 1.

FIG. 2 illustrates a first stage in the process of manufacturing valve layer 10. In this first stage, base plate 14 is bonded to an underside of substrate 12 (or substrate 12 is formed on base plate 14).

Figure 3:
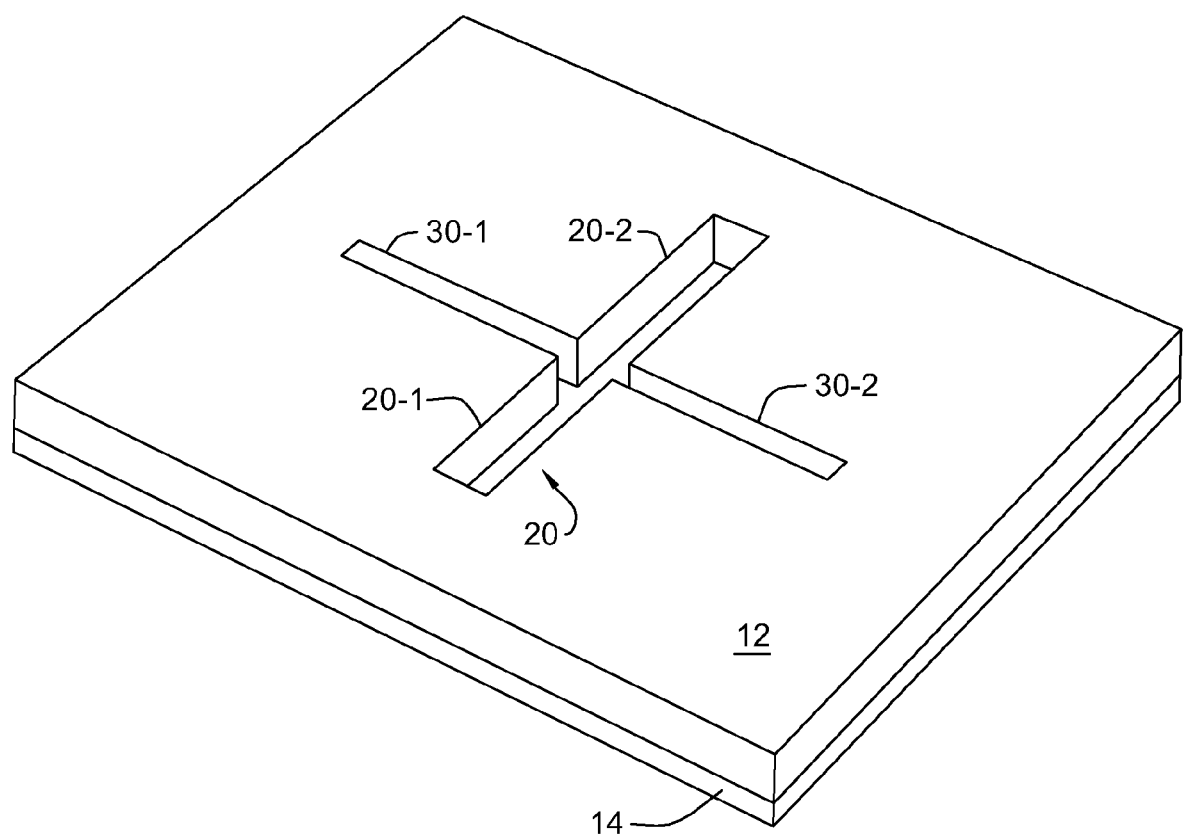
FIG. 3 is a perspective view of a second stage in manufacture of the lower operative layer of the check valve of FIG. 1.

FIG. 3 illustrates a second stage in the process of manufacturing valve layer 10. In this second stage, substrate 12 has been etched (for example by semiconductor etching techniques) to form channel 20 and intersecting channel portions 30-1 and 30-2 of channel 30.

Figure 4:
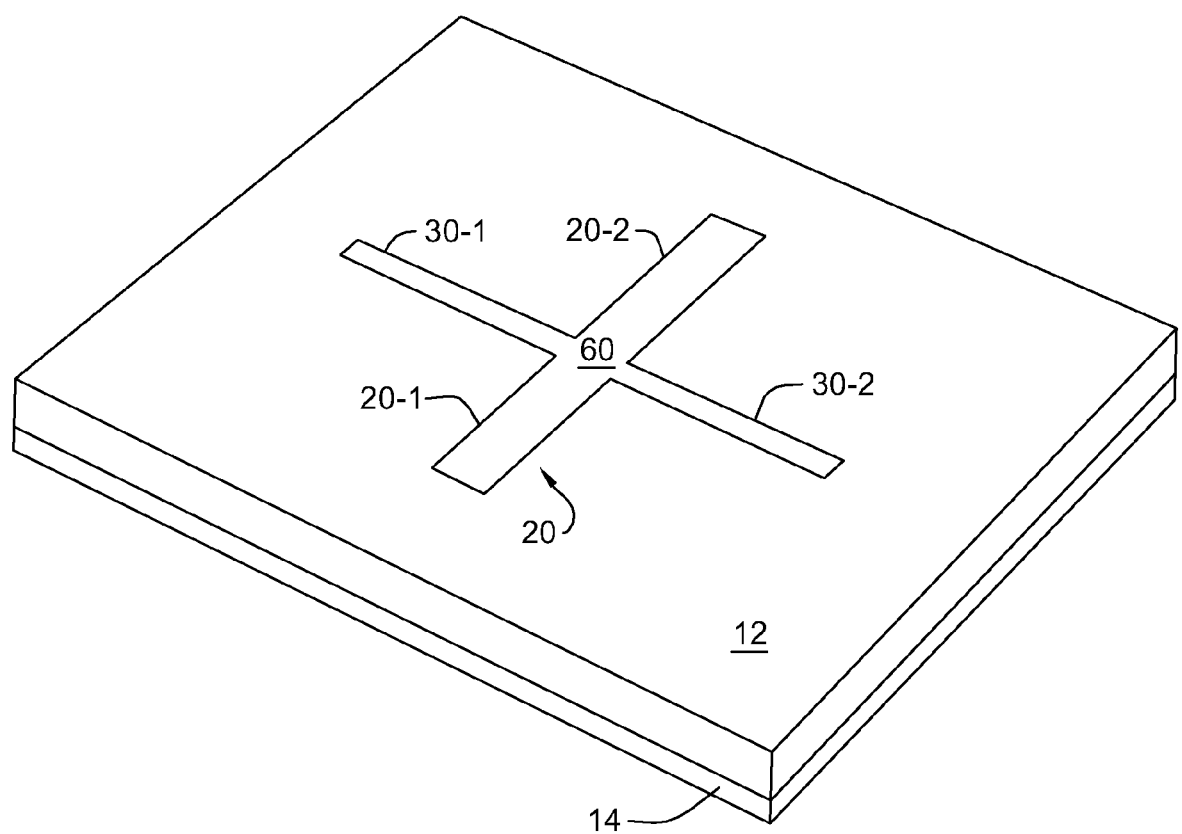
FIG. 4 is a perspective view of a third stage in manufacture of the lower operative layer of the check valve of FIG. 1.

FIG. 4 illustrates a third stage in the process of manufacturing valve layer 10. In this third stage, channel 20 and channel portions 30-1 and 30-2 have been filled with a filler material 60 that has material properties different from the material of substrate layer 12 and base plate 14 such that the filler material 60 may be processed, deposited, etched, or removed without altering substrate 12 or base plate 14. Filler material 60 may comprise glass, oxide, nitride, doped silicon, silicide, metal, etc. where the substrate 12 is silicon and the base plate 14 is silicon. Alternately, filler material 60 may be deposited as a uniform layer filling the channels and coating the surface of substrate 12 after which the material on the surface is removed by etching or mechanical abrasion. Alternatively, the filler material 60 may be deposited by chemical vapor deposition followed by reactive ion etching removing all but the sidewalls lining the channels.

Figure 5:
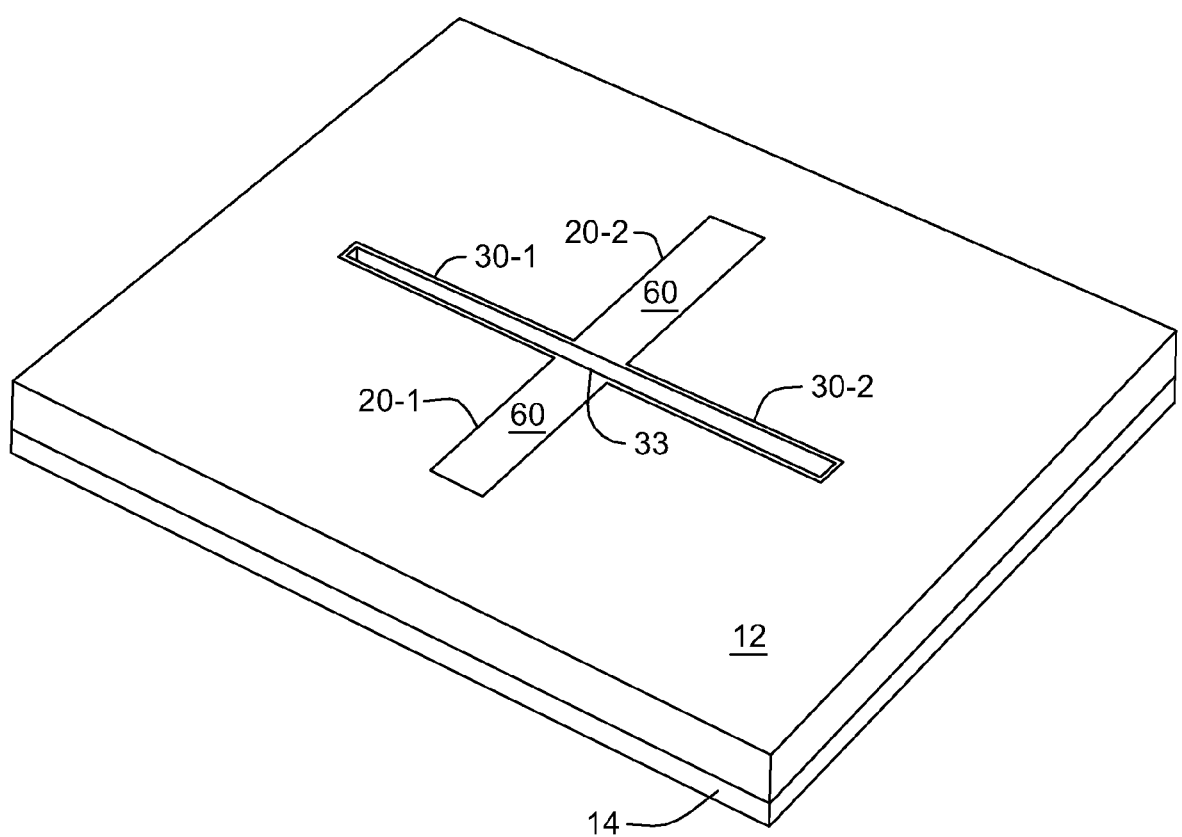
FIG. 5 is a perspective view of a fourth stage in manufacture of the lower operative layer of the check valve of FIG. 1.

FIG. 5 illustrates a fourth stage in the process of manufacturing valve layer 10. In this fourth stage, filler material 60 has been etched by wet chemical etching, ion milling, reactive ion etching, or other semiconductor like etching process using a photo lithographic process to define a a mold 33 within filler material 60 within channel portions 30-1 and 30-2. The mold 33 has the outer shape of web portions 40-1 and 40-2.

Figure 6:
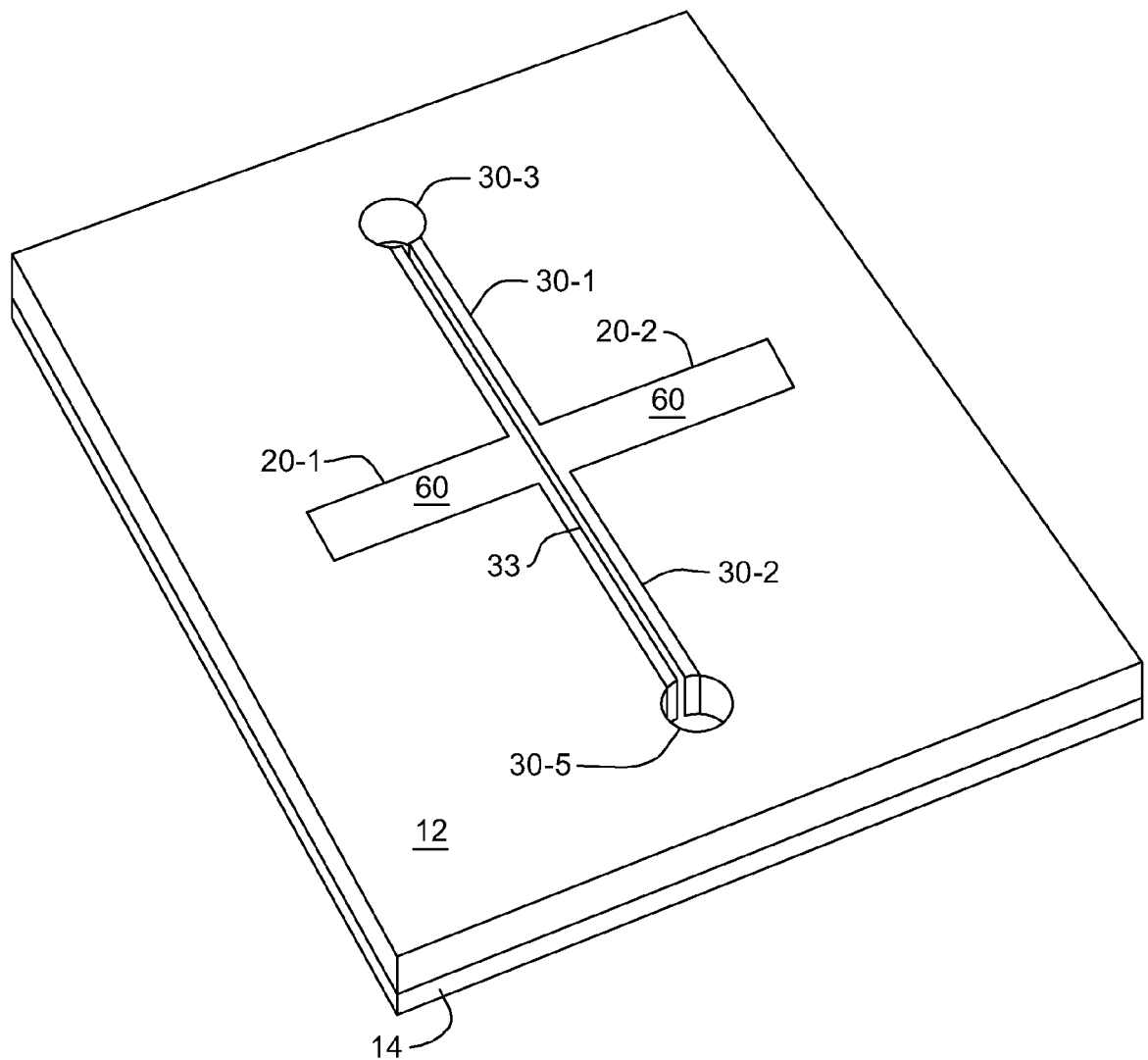
FIG. 6 is a perspective view of a fifth stage in manufacture of the lower operative layer of the check valve of FIG. 1.

FIG. 6 illustrates a fifth stage in the process of manufacturing valve layer 10. In this fifth stage, substrate 12 has been further etched by wet chemical etching, ion milling, reactive ion etching, or other semiconductor like etching process using a photo lithographic process to form circular channel portion 30-3 and a circular channel portion 30-5 in substrate 12. These etchants have not effected material 60.

Figure 7:
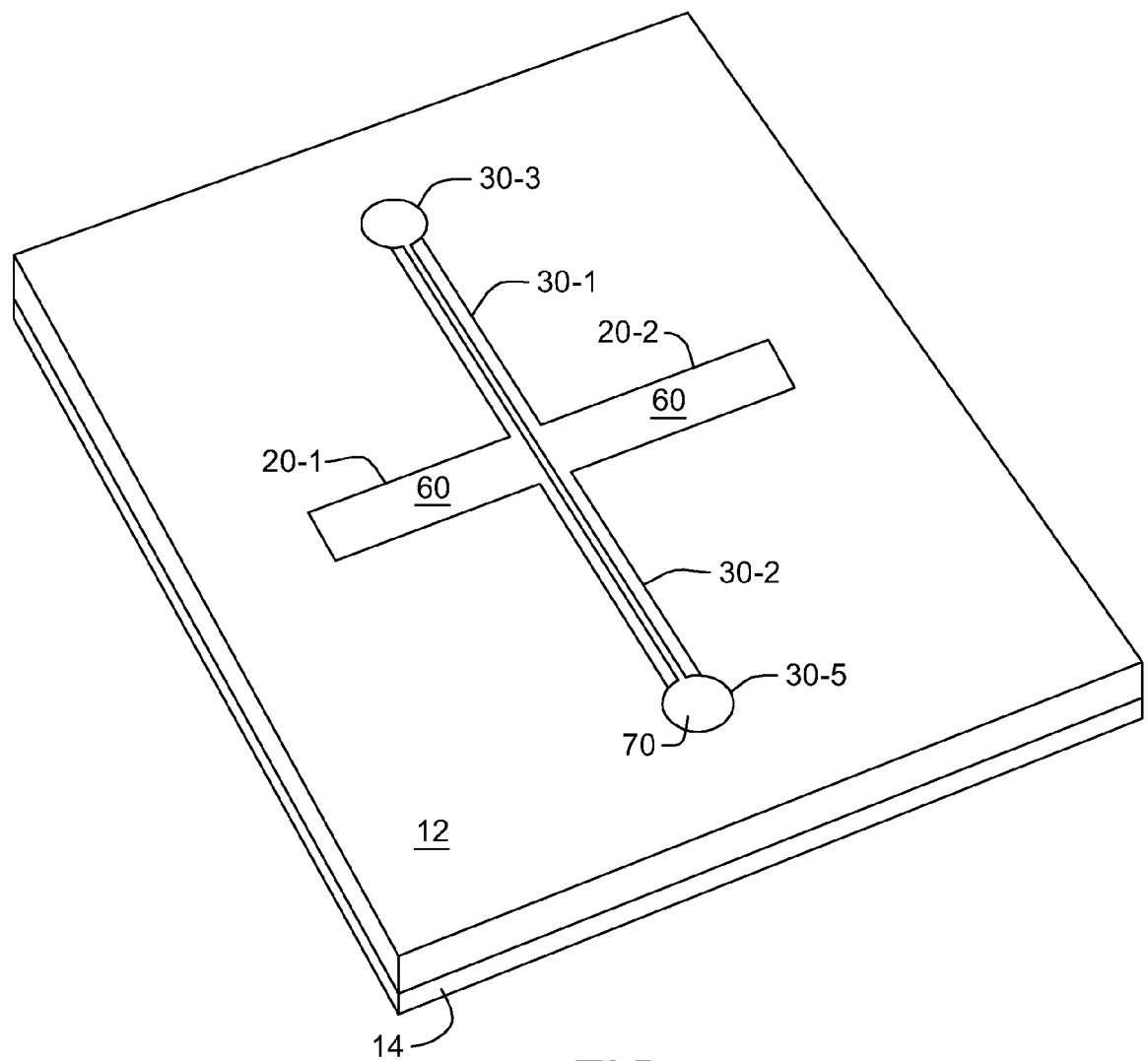
FIG. 7 is a perspective view of a sixth stage in manufacture of the lower operative layer of the check valve of FIG. 1.

FIG. 7 illustrates a sixth stage in the process of manufacturing valve layer 10. In this sixth stage, the narrow mold 33 (in the material 60 within channel 30) etched in the fourth stage, and the circular channel portions 30-3 and 30-5 etched in the fifth stage have been filled with elastomeric material 70 and cured by a method appropriate for the elastomer such as heat, time, or a combination of both. By way of example, the mold 33 was filled with the elastomeric material by spreading the elastomeric material 70 over layer 12 by a squeegee or may alternatively be deposited as a uniform layer filling the mold 33 and coating the surface of substrate 12 after which the material on the surface is removed by etching or mechanical means.

Figure 8:
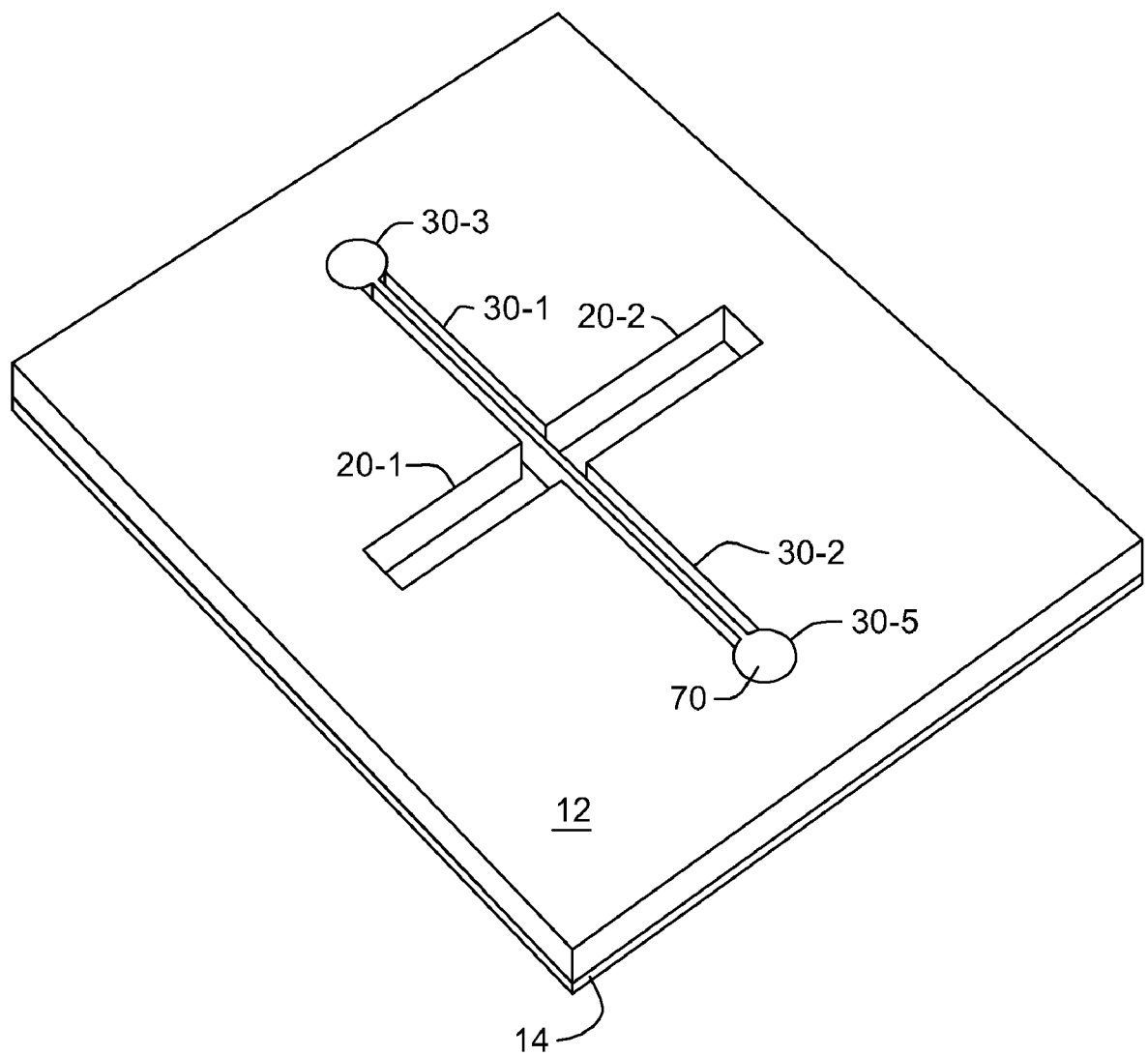
FIG. 8 is a perspective view of a seventh stage in manufacture of the lower operative layer of the check valve of FIG. 1.

FIG. 8 illustrates a seventh stage in the process of manufacturing valve layer 10. In this seventh stage, all the remaining material 60 in channel 20 and channel portions 30-1 and 30-2 is removed by etching with an etchant in which material 60 is soluble or by a reactive ion milling or sputtering process where the etchant is removed while leaving all other materials. These etchants have not effected elastomeric material 70.

Figure 9:
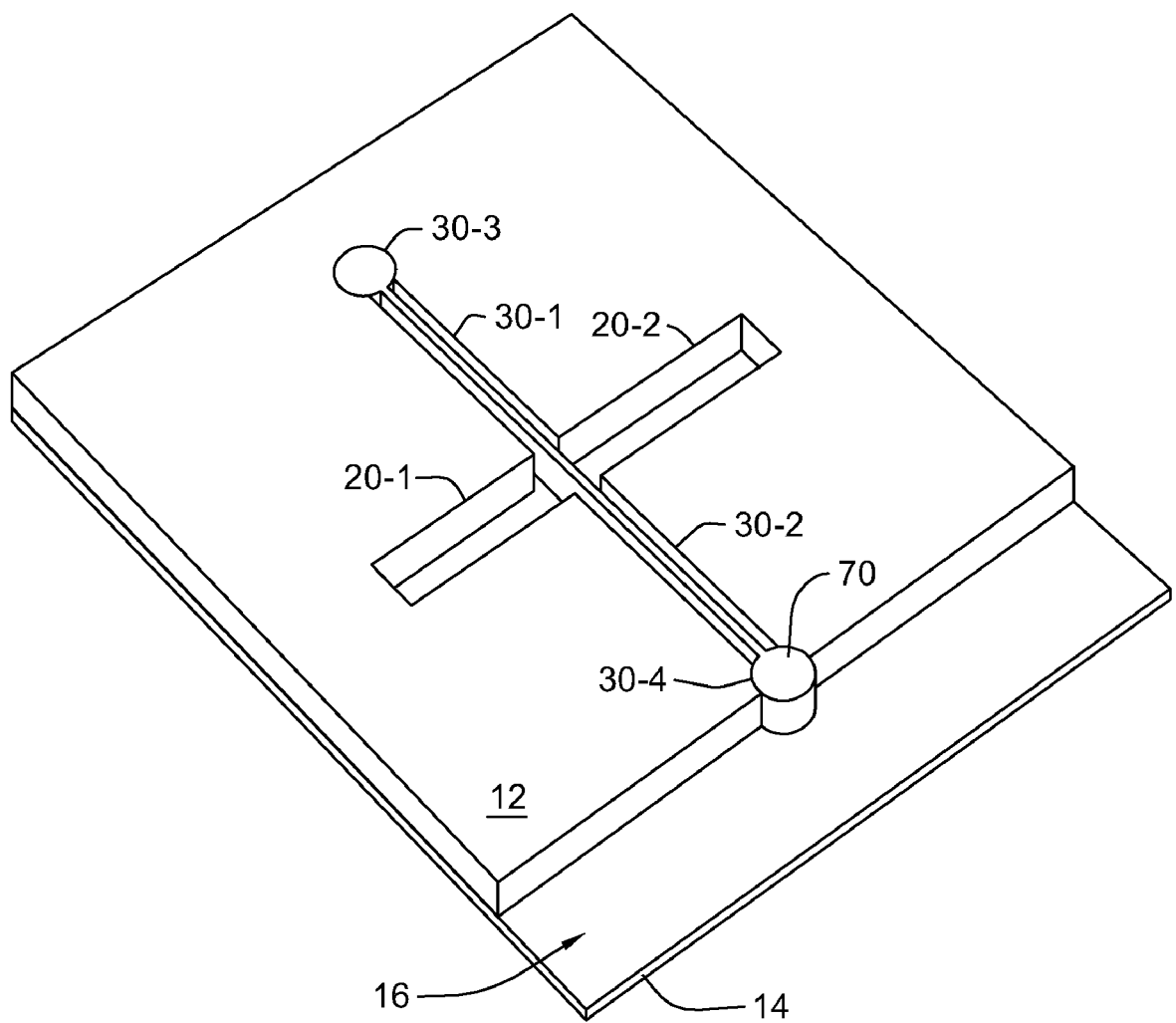
FIG. 9 is a perspective view of an eighth stage in manufacture of the lower operative layer of the check valve of FIG. 1.

FIG. 9 illustrates an eighth stage in the process of manufacturing valve layer 10. In this eighth stage, a portion of substrate 12 perpendicular to and bisecting circular channel portion 30-5 has been etched away by wet chemical etching, ion milling, reactive ion etching, or other semiconductor like etching process using a photo lithographic process to form channel 16 and remove part of circular channel portion 30-5 to form semicircular channel portion 30-4. These etchants have not effected elastomeric material 70. The result of this eighth stage is the bottom valve layer 10 of check valve 8 of FIG. 1.

The final stage of processing is to add upper layer or top plate 9 to the substrate 12 to enclose channel 30 and allow entry of fluids from above into channel 20, as illustrated in FIG. 1. This can be accomplished by bonding top plate 9 (with openings 50-1 and 50-2) to the substrate 12 with an adhesive.

Figure 10:
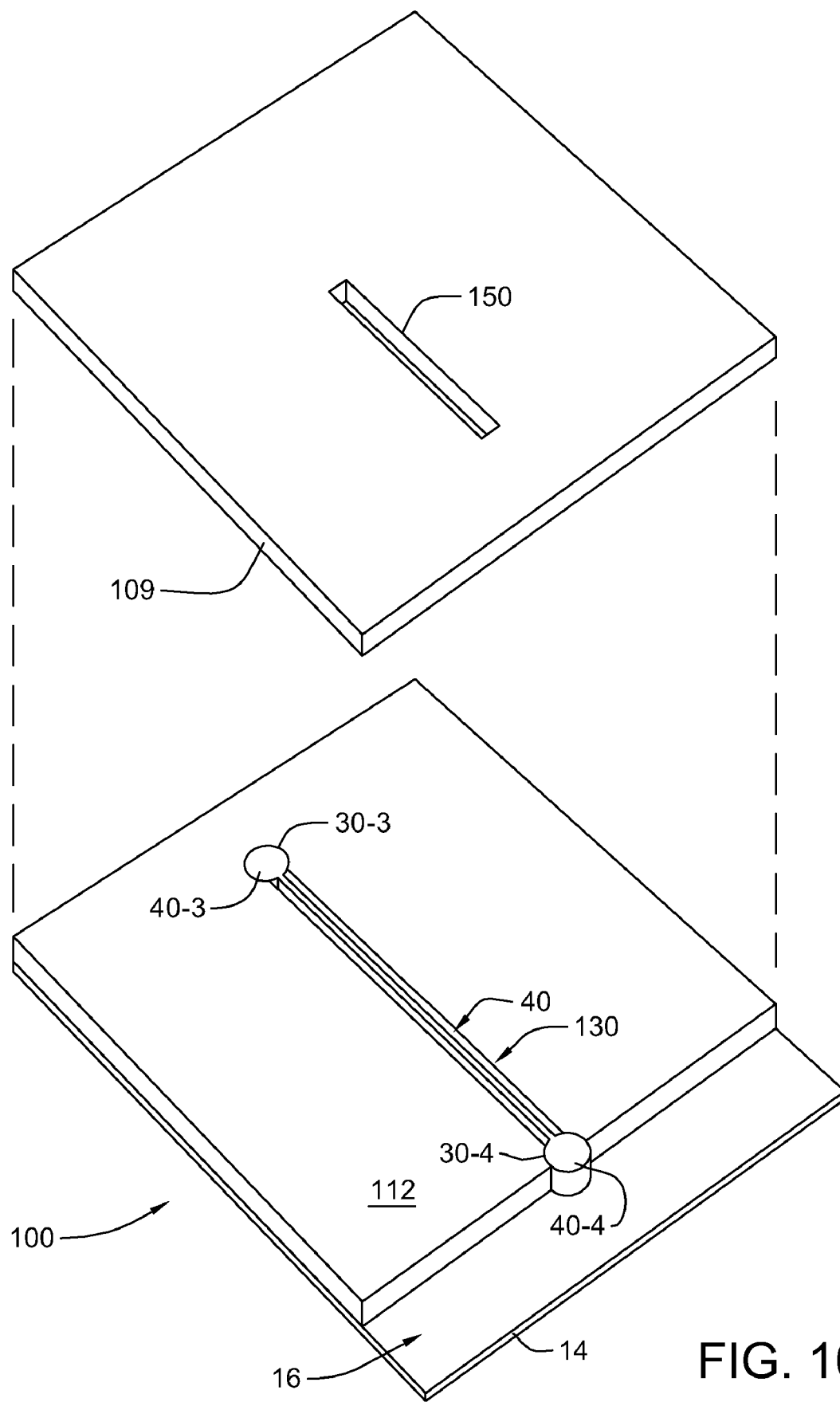
FIG. 10 is an exploded view of a check valve according to another embodiment of the present invention.

FIG. 10 illustrates another check valve generally designated 100 according to another embodiment of the present invention. Check valve 100 is the same as check valve 8 except as follows. Check valve 100 does not include channel 20 in substrate 12 or openings 50-1 or 50-2 in upper layer 9. Instead, upper layer 109 in check valve 100 includes an opening 150 which is aligned with a channel 130. Channel 130 is the same as channel 30 except that the central region of channel 130 is enclosed by side walls along its entire length (because there is no intersecting channel 20). Also, substrate 112 is the same as substrate 12 except that substrate 112 does not include channel 20. Fluid enters directly into channel 130 from the opening 150 in upper layer 109, and the pressure from the fluid will open the valve (i.e. separate valve plug 40-4 from valve seat 30-4) if the pressure is above the actuation level, and allow the fluid to pass through the channel 130 into channel 16.

Based on the foregoing, a check valve according to the present invention has been disclosed. However, numerous modifications and substitutions can be made without deviating from the scope of the present invention. For example, additive processes instead of subtractive processes as illustrated above can be used to form the channels 20 and 30. Also, the check valve can be used as a pressure release valve in other applications. Also, a series of check valves can be coupled to the same fluid source, with a different tension in the elastomeric web of each check valve, to act as a pressure sensor in other applications. Therefore, the present invention has been disclosed by way of illustration and not limitation, and reference should be made to the following claims to determine the scope of the present invention.

What is claimed:

1. A check valve comprising:

a substrate;

a channel in the substrate, the channel having an anchor seat, a channel corridor and a valve seat, the anchor seat being wider than the channel corridor and located at one end of the channel corridor, the valve seat being wider than the channel corridor and located at an apposite end of the channel corridor; and an elastomeric valve mechanism in the channel, the valve mechanism having an anchor portion which is wider than the channel corridor and located in the anchor seat, an elastomeric web portion which is narrower than the channel corridor, located in the channel corridor and extended substantially the entire length of the channel corridor, and a valve plug which is wider than the channel corridor and located in the valve seat, the elastomeric web portion interconnecting the anchor portion and the valve plug through the channel corridor, the elastomeric web portion being in a stretched state such that the valve plug is forced by the elastomeric web portion in a direction toward the anchor portion against the valve seat to seal the valve seat, and wherein the force of the elastomeric web portion forcing the valve plug against the valve seat is high enough to substantially seal the channel at the valve seat absent over-riding, operative fluid pressure within the channel but low enough to be overcome by operative fluid pressure within the channel parallel to the elastomeric web portion to force the valve plug in a direction away from the anchor portion to separate the valve plug from the valve seat and thereby open the channel at the valve seat to allow the fluid to exit the channel via the valve seat.

2. A check valve as set forth in claim 1 wherein the anchor portion, the web portion and the valve plug are integral with each other, and formed from elastomeric material.

3. A check valve as set forth in claim 1 further comprising:
   another substrate bonded to a face of the first said substrate, the other substrate including an opening through the other substrate leading into the channel to supply the fluid to the channel.

4. A check valve comprising:
   a substrate;
   a first channel in the substrate, the first channel having an anchor region, a channel corridor and a valve seat region;
   an elastomeric valve mechanism in the first channel, the valve mechanism having an anchor portion anchored in the anchor region, an elastomeric web portion in the channel corridor and a valve plug in the valve seat region, the elastomeric web portion interconnecting the anchor portion and the valve plug, the elastomeric web portion being in a stretched state such that the valve plug is forced by the elastomeric web portion against the valve seat region to seal the valve seat region, and wherein the force of the elastomeric web portion can be overcome by operative fluid pressure within the first channel to separate the valve plug the valve seat thereby open the first channel at the valve seat region to allow the fluid to exit the first channel via the valve seat region;
   a second channel within the substrate, the second channel intersecting the first said channel to supply the fluid into the first channel.

5. A check valve as set forth in claim 4 wherein a portion of the second channel is located on one side of the first channel and another portion of the second channel is located on another side of the first channel, and the elastomeric web portion separates the first portion from the second portion of the second channel.

6. A check valve as set forth in claim 4 further comprising:
   another substrate bonded to a face of the first said substrate, the other substrate including an opening through the other substrate leading into the second channel to supply the fluid to the second channel en route to the first channel.

7. A check valve as set forth in claim 1 wherein the web portion is shaped like a ribbon.

8. A check valve as set forth in claim 1 wherein the valve seat is semicircular and the valve plug is cylindrical.

9. A check valve as set forth in claim 1 wherein the substrate is made of semiconductor material.

10. A method for operating the check valve of claim 1, comprising the steps of:
    in one mode of operation intended not to allow the fluid to exit the channel via the valve seat, exerting less than a first predetermined threshold of pressure by the fluid, the first predetermined threshold of pressure being insufficient to force the valve plug away from the valve seat; and
    in another mode of operation intended to allow the fluid to exit the channel via the valve seat, exerting greater than a second predetermined threshold of pressure by the fluid, the second predetermined threshold of pressure being sufficient to force the valve plug away from the valve seat.

* * * * *